Aug. 9, 1966

L. SPIEGEL 3,266,034

CONTROL APPARATUS

Filed June 21, 1963

INVENTOR.
LEO SPIEGEL
BY
Roger W. Jensen
ATTORNEY

Aug. 9, 1966   L. SPIEGEL   3,266,034
CONTROL APPARATUS

Filed June 21, 1963   4 Sheets-Sheet 2

INVENTOR.
LEO SPIEGEL
BY
Roger W. Jensen
ATTORNEY

Aug. 9, 1966    L. SPIEGEL    3,266,034
CONTROL APPARATUS
Filed June 21, 1963    4 Sheets-Sheet 4

INVENTOR.
LEO SPIEGEL
BY Roger W. Jensen
ATTORNEY

United States Patent Office 3,266,034
Patented August 9, 1966

3,266,034
CONTROL APPARATUS
Leo Spiegel, Clearwater, Fla., assignor to Honeywell Inc., a corporation of Delaware
Filed June 21, 1963, Ser. No. 289,628
5 Claims. (Cl. 340—347)

This invention pertains to an angle pickoff and more particularly to a pickoff which produces electrical signals indicative of the angle of rotation, or the relative rotation, and the rate of change of the angle, or the rate of rotation, between a plurality of members.

Prior art angle pickoff devices are capable of measuring the angle of rotation (relative rotation) between a shaft and a stationary frame or between two rotating shafts. Whenever the angle of rotation between two or more mechanical inputs are to be measured with respect to a reference frame and with respect to each other it is necessary to utilize several of the prior art devices to obtain all of the desired measurements.

In the present invention two or more mechanical inputs may be applied to the apparatus and electrical output signals are obtained therefrom which are indicative of the relative rotation and the rate of rotation of each of the inputs with respect to the reference frame and with respect to each other. This is accomplished in the following manner. A rotatably mounted member is attached to each mechanical input and a stationary surface of the frame of the device is utilized as the reference. A continuously rotating member has a plurality of surfaces which rotate in juxtaposition to the surface on the frame and a surface on each of the rotatably mounted members. All of these surfaces have cooperative means situated thereon which interact upon relative rotation between the surfaces to provide electrical pulses indicative of that relative rotation. The output pulses of any two pairs of surfaces may then be applied to electronic circuitry to determine the relative rotation as well as the rate of rotation between the two inputs of the two pairs of surfaces. In the electronic circuitry a high frequency oscillator is utilized to determine portions of output pulses so that the angle of rotation between two inputs can be accurately measured within a precise tolerance. The present device has the capability of indicating this angle many times per second. Since the angle can be measured many times per second the rate of rotation can be obtained from the change in the angle. A detailed explanation of the operation of the cooperative means, the electronic circuitry and the oscillator is disclosed in the copending application of William F. Acker and Leo Spiegel, filed June 8, 1962, Serial No. 201,055, now Patent No. 3,178,562 and having the same assignee as the present application.

It is the primary object of this invention to provide an improved control apparatus.

It is a further object of this invention to provide means for measuring relative rotation and rate of rotation between a plurality of inputs and a reference frame.

These and other objects of this invention will become apparent from the following description of a preferred form thereof and the accompanying specification, claims and drawings, of which:

Figure 1:
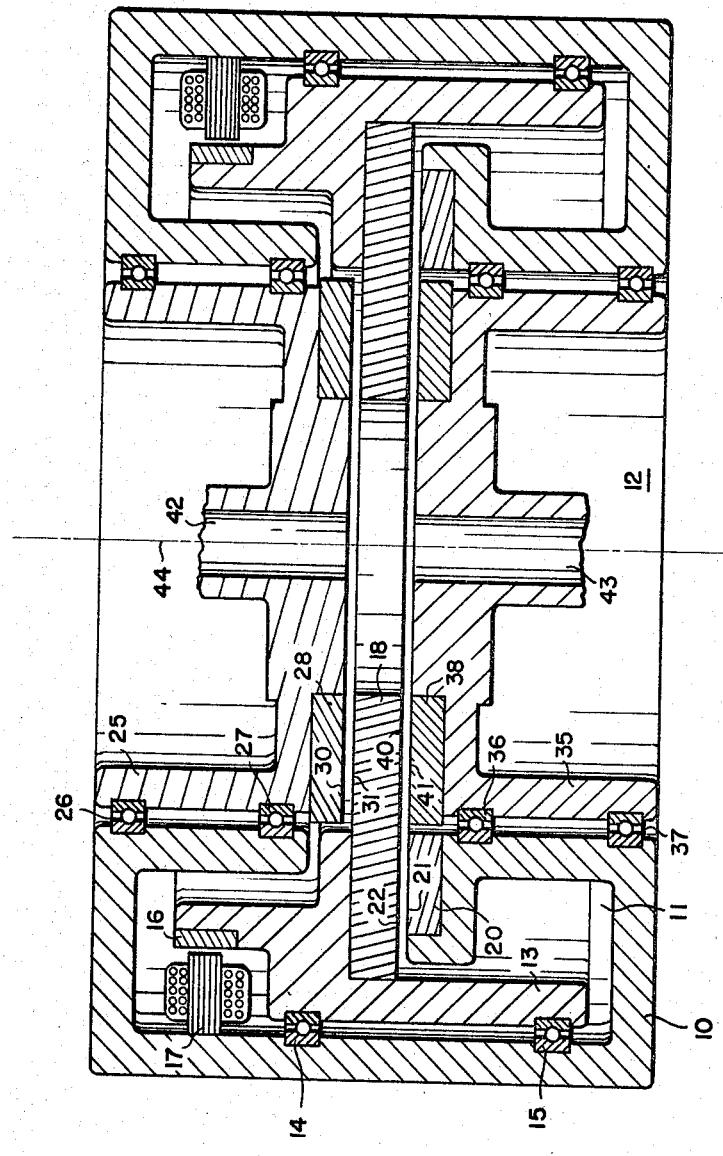
FIGURE 1 is a cross sectional view of the present invention illustrating the relationship of the various components.

In FIGURE 1 the numeral 10 designates a hollow cylindrical frame or base means, having a G shaped cross section, which is symmetrical about a longitudinal axis 44. The inner opening within the frame is designated 11. The central or longitudinal opening is designated 12. A rotor 13 having a generally hollow cylindrical configuration is mounted for rotation about the axis 44 within the inner opening 11 of the frame 10 by suitable means such as a pair of ball bearings 14 and 15. It should be understood that for purposes of assembly the frame 10 is constructed in two portions having a junction at which they are matched and connected together by some means such as bolts. In this embodiment rotor 13 has a diameter just large enough to allow it to be supported by bearings 14 and 15 placed between the rotor 13 and frame 10. It should be understood that bearings 14 and 15 may be placed anywhere between the two members as long as they allow angular rotation but prevent substantially any axial or radial movement. Rotor 13 has an extended shoulder portion 16 coacting with a wound stator 17 fixed to frame 10 to form means for continuously rotating rotor 13. Stator 17 and rotor 16 may for example form a hysteresis synchronous motor and stator 17, while not shown in detail, is wound and energized in a manner well known in the art.

A flat disk shaped plate 18 is fixedly attached to rotor 13 by means such as screws or the like, not shown. Plate 18 protrudes radially through the opening in the G shaped cross section of frame 10 into the central or longitudinal opening 12. A flat ring shaped member 20 is fixedly mounted by means such as screws or the like, not shown, to the flat portion of the frame 10 in the opening between the inner opening 11 and the central longitudinal opening 12. Ring 20 and disk 18 are mounted in juxtaposition to provide two spaced apart, parallel surfaces 21 and 22. A small air gap between surface 21 on ring 20 and surface 22 on disk 18 provide sufficient spacing to permit relative rotation between surfaces 21 and 22.

A first generally cylindrical shaped member 25 is rotatably mounted within the longitudinal opening in base means 10 by means of a pair of bearings, which may be ball bearings or the like, 26 and 27. The outer diameter of cylindrical member 25 is slightly smaller than the inner diameter of the cylindrical opening 12 in base means 10. Thus, the bearings 26 and 27 may be placed between the outer surface of cylindrical member 25 and the inner surface of base means 10 to hold the cylindrical member 25 firmly within the cylindrical opening 12 and allow 360 degree rotation about the axis 44.

Fixedly attached to the end of the cylindrically shaped member 25 is a ring shaped member 28. Member 25 is mounted within the longitudinal opening 12 of frame 10 in contiguous relationship to disk 18 so that ring 28 is in juxtaposition with disk shaped member 18. Ring 28 and disk 18 provide a pair of parallel surfaces 30 and 31 respectively having an air gap therebetween to allow relative rotation.

A second cylindrical member 35 having an outer diameter slightly smaller than the inner diameter of the longitudinal opening 12 in base means 10 is mounted for rotation about axis 44 within the longitudinal opening 12 by means of a pair of bearings 36 and 37, which may be ball bearings or the like. Cylindrical member 35 has a ring shaped member 38 mounted on the inner end. Cylindrical member 35 is mounted in contiguous relationship to disk 18 so that ring shaped member 38 is in juxtaposition with disk shaped member 18 but on the side opposite to that of ring shaped member 28. Disk shaped member 18 and ring shaped member 38 provide a pair of parallel surfaces 40 and 41, respectively, having an air gap therebetween to allow relative rotation.

A first input shaft, not shown, may be attached to cylindrical member 25 by means of aperture 42 centrally located in member 25. A second input shaft, not shown, may be attached to cylindrical member 35 by means of an aperture 43 centrally located in member 35. Aperture 42 and aperture 43 are situated along the longitudinal axis 44 of frame 10, and are coaxial therewith. Also, cylindrical member 25, cylindrical member 35, and rotor 13 are coaxial and mounted for 360 degree rotation about axis 44. Thus, cylindrical member 25 is rotatable about axis 44, independent of frame 10 and is driven according to a first mechanical input. Cylindrical member 35 is rotatable about axis 44, independent of base means 10 and is driven according to a second mechanical input. Rotor 13 is continuously driven about axis 44 and has an attached disk shaped member 18 which is interposed between the ends of cylindrical member 25 and cylindrical member 35. The surfaces 21, 22, 30, 31, 40 and 41 all have cooperative means situated thereon having a configuration similar to that illustrated in FIGURE 2.

Figure 2:
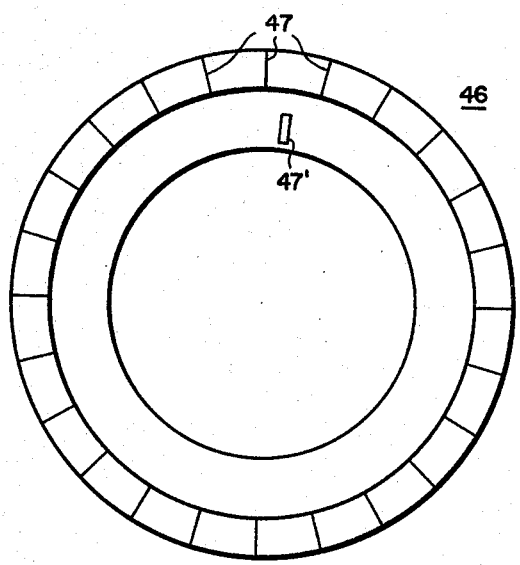
FIGURE 2 is a view of the cooperative means on one surface.

In FIGURE 2 a set of radial segments 47 situated around the outer periphery of a ring shaped member 46 in a spaced apart relationship and a single, larger radial segment 47' situated near the inner periphery of ring shaped member 46 constitute cooperative means. The cooperative means 47 and 47' situated on the surface of ring shaped member 46 may be any means which when properly energized and rotated relative to a similar surface mounted parallel and in juxtaposition thereto would provide a pulse each time the segments designated 47 are axially aligned with similar segments on the adjacent surface. Also, the segment 47' will provide a pulse each time it is aligned axially with a similar segment on the adjacent surface. In this embodiment segments 47 and 47' are comprised of a conducting material. When all of the segments 47 align axially with all of the segments 47 on an adjacent surface, for example surfaces 21 and 22, the capacity between the two surfaces is greatly increased and a pulse of electrical current can be produced by means which will be explained in detail later. Pairs of surfaces 21 and 22, 30 and 31, and 40 and 41 all interact in the manner described to provide electrical pulses indicative of the relative rotation therebetween. It should be noted that while segments 47 are shown as equiangularly spaced segments of radial lines they might actually take on a variety of configurations. Since all of the segments on one surface are aligned simultaneously with all of the segments on the adjacent surface to produce one pulse, any misalignment of a few segments will have relatively little effect.

Figure 3:
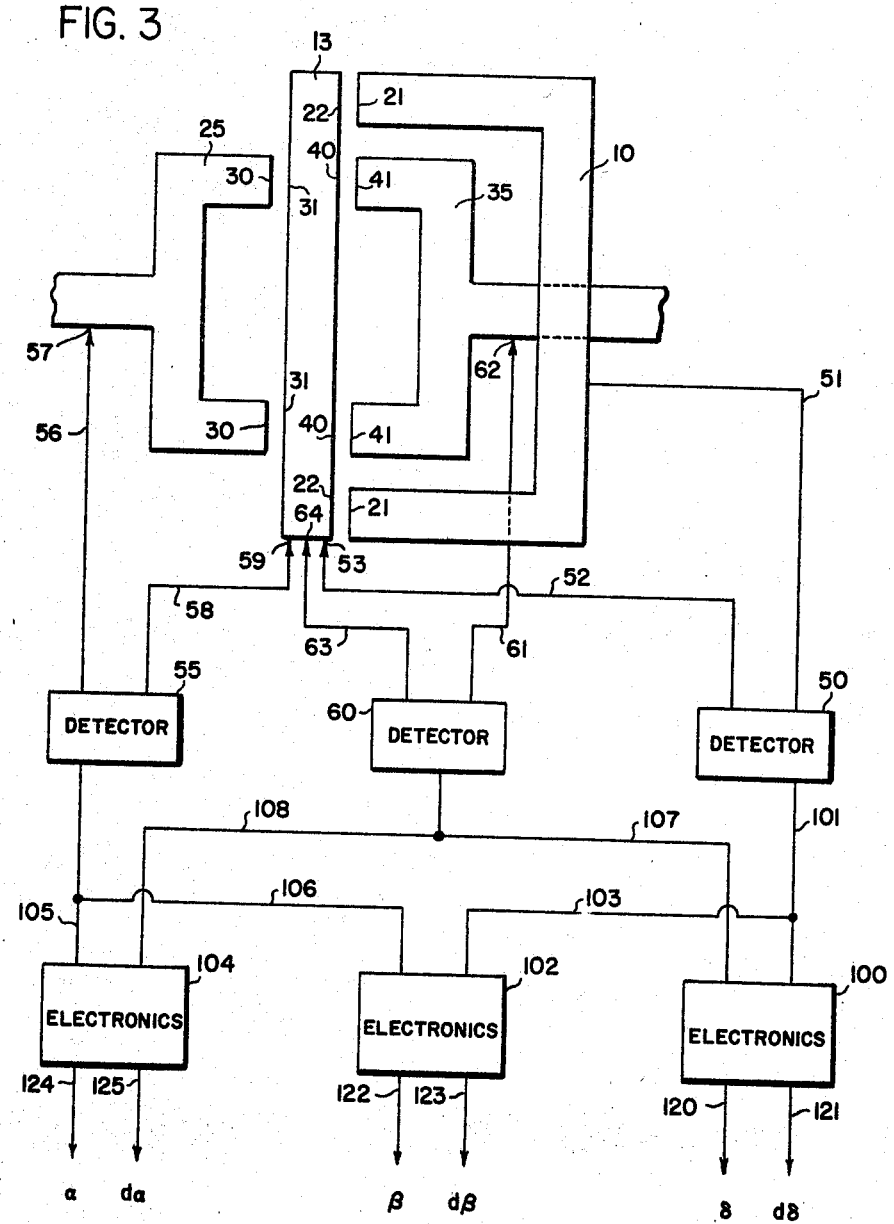
FIGURE 3 is a block diagram of the present invention.

In FIGURE 3 a block diagram of the angle pickoff device complete with the associated electronics is shown. This diagram is simply illustrative of the electrical connections from the various rotating components and the frame of the device to the electronics of the system. The portion designated 10 represents the base means or the frame of the device which is shown in detail in FIGURE 1. Similar numbers have been used throughout FIGURE 3 to aid in identifying the portions in FIGURE 3 with those in FIGURE 1. The member designated 13 represents the rotor or the continuously rotating member of the present invention. The cooperative means situated on surface 21 of base means 10 are connected to a detector 50 by means of a lead 51. The cooperative means situated on surface 22 of rotor 13 which coact with the cooperative means on surface 21 to provide electrical pulses are connected to detector 50 by means of a lead 52. Lead 52 receives signals from the rotating element 13 by a connecting means, designated numeral 53. The member designated 25 represents the rotatably mounted member to which a first mechanical input may be connected. Surface 30 of member 25 and surface 31 of rotor 13 have cooperative means situated thereon which coact to provide electrical pulses. The cooperative means on surface 30 of member 25 are electrically connected to a detector 55 by means of a lead 56. Lead 56 receives signals from the rotatable member 25 by a connecting means, designated 57. The cooperative means on surface 31 of rotor 13 are connected to detector 55 by means of a lead 58. Lead 58 receives signals from the rotor 13 by a connecting means, designated 59. The member designated 35 is representative of the second rotatably mounted member in FIGURE 1 which is adaptable to have a second mechanical input applied thereto. The surface 41 on rotatable member 35 and the surface 40 on rotor 13 have cooperative means situated thereon which coact to provide electrical pulses. The cooperative means on surface 41 are connected to a detector 60 by means of a lead 61. Lead 61 receives signals from the rotatable member 35 by a connecting means, designated 62. The cooperative means situated on surface 40 are connected to detector 60 by a connecting means, designated 64. It should be noted that the connecting means 53, 57, 59, 62 and 64 all may be any means by which an electrical signal can be transmitted from a rotating member to a stationary member an example of which is slip rings and brushes.

Figure 5:
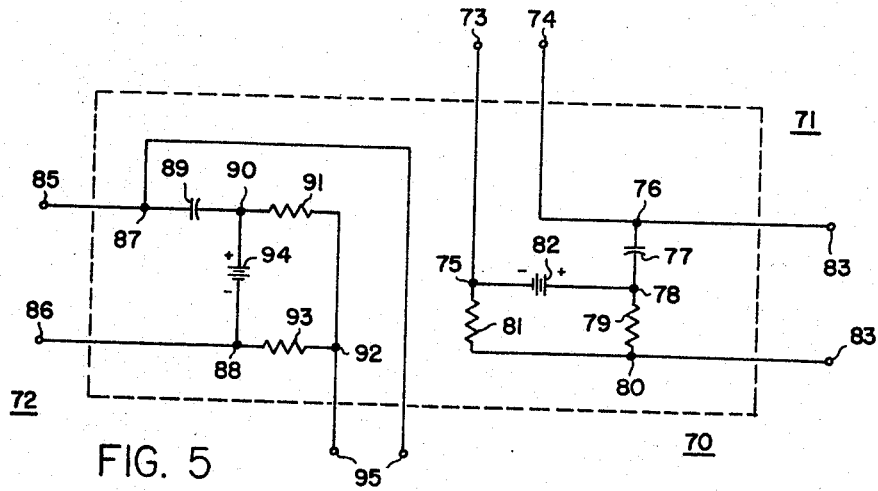
FIGURE 5 is a schematic diagram of a detector.

A typical detector which may be utilized in the blocks 50, 55 and 60 is illustrated in FIGURE 5. It should be noted that the detector illustrated in FIGURE 5 is simply one possible embodiment of this invention and the cooperative means and detectors could be magnetic or optical pulse producing means or any other of a wide variety of methods and means to provide electrical pulses indicative of the rotation of one surface with respect to the other. In FIGURE 5 the numeral 70 represents a detector circuit which is comprised of two bridge circuits designated 71 and 72. Bridge circuit 71 has an input consisting of two leads 73 and 74. Lead 73 is connected to the cooperative means 47 on one of the pairs of adjacent surfaces, for example 21 and lead 74 is connected to the cooperative means 47 on the opposite adjacent surface for example 22. As the cooperative means 47 on surface 22 rotate past the cooperative means 47 on surface 21 a variable capacitive effect occurs, in this embodiment. This variable capacitive effect is connected into one leg of bridge circuit 71 by leads 73 and 74 which connect to a pair of terminals 75 and 76 respectively. A capacitor 77 is connected in a second leg of bridge 71 between terminal 76 and a terminal 78. A resistor 79, connected between terminal 78 and a terminal 80 forms a third leg of the electrical bridge circuit and a resistor 81, connected between terminal 80 and terminal 75, forms the fourth leg of the bridge circuit. A power supply 82, connected between terminals 75 and 78 is utilized to energize the bridge circuit and a pair of leads 83, connected between terminals 76 and 80, are provided for the output which will be a series of five pulses.

The second bridge circuit 72 in detector 70 is utilized to produce coarse electrical pulses from the capacitance change due to the coarse segments 47'. A pair of input leads 85 and 86 connected to a pair of terminals 87 and 88 respectively are also connected to the cooperative means 47' on a pair of adjacent surfaces such as 21 and 22. The variable capacitance produced by the radial aligning and misaligning of segments 47' is connected to one leg of bridge circuit 72. A capacitor 89 connected between terminal 87 and a terminal 90 forms a second leg of bridge circuit 72. A resistor 91 connected between terminal 90 and a terminal 92 forms a third leg and a resistor 93 connected between terminals 88 and 92 forms a fourth leg of bridge circuit 72. A power supply 94 is connected between terminals 88 and 90 to energize the bridge circuit and the output appears on a pair of leads 95 which are connected between terminals 87 and 92.

Returning to FIGURE 3, the signals from detector 50 are connected to a block of electronic circuitry designated 100 by means of a lead 101. The signals from detector 50 are also connected to a block of electronic circuitry designated 102 by a lead 103. The signals from detector 55 are connected to a block of electronic circuitry designated 104 by means of a lead 105. The signals from detector 55 are also connected to electronic circuitry 102 by means of a lead 106. The signals from detector 60 are connected to electronic circuitry 100 by means of a lead 107 and to electronic circuitry 104 by means of a lead 108. The electronic circuitry contained in blocks 100, 102 and 104 are all similar and are explained in detail in conjunction with FIGURE 4.

Figure 4:
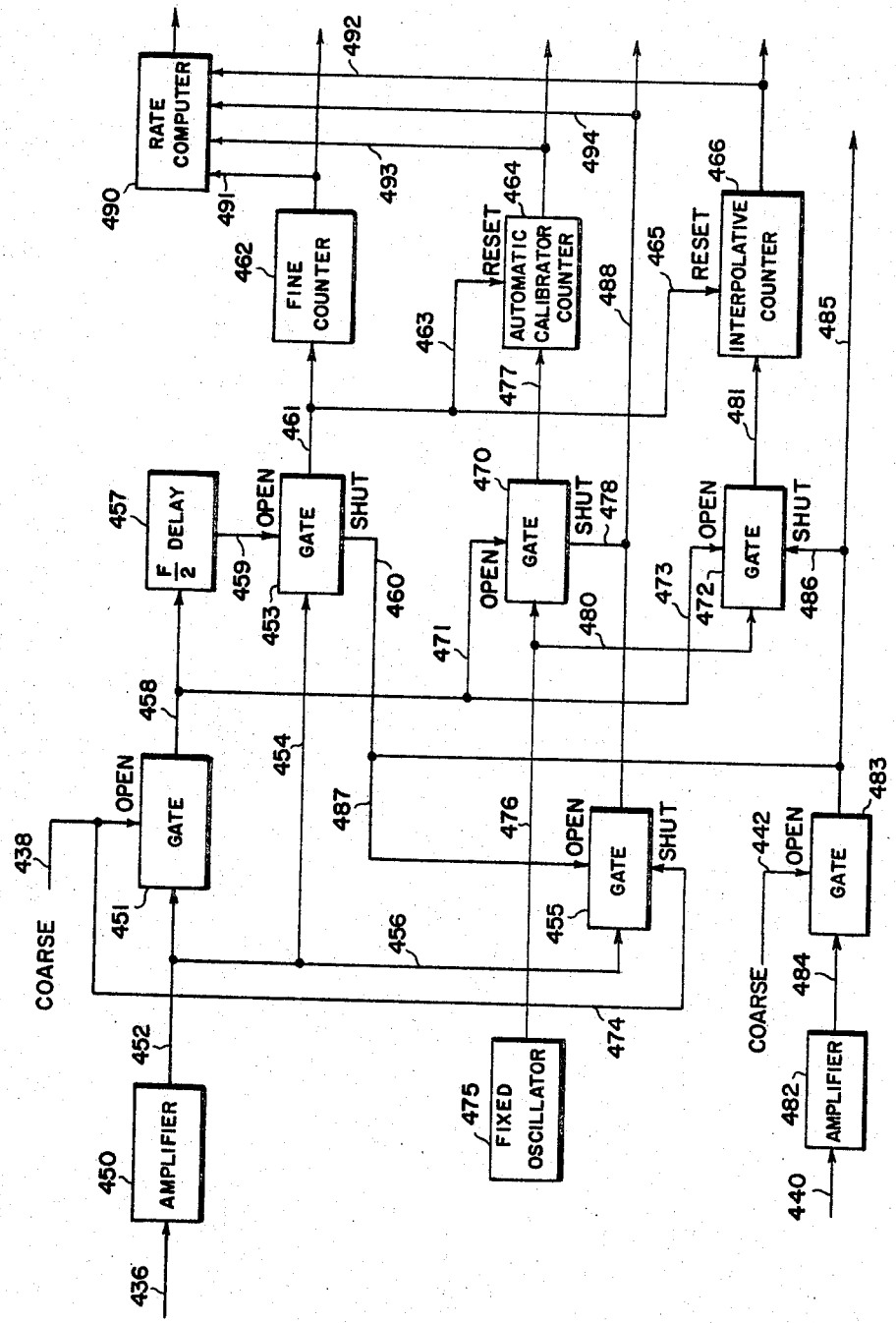
FIGURE 4 is a block diagram of the associated electronics.

In FIGURE 4, the fine pulses from a detector, which may be detector 50, 55 or 60, are applied to an amplifier 450 by connecting means 436. The output from amplifier 450 is applied to a gate 451 by means of a lead 452. It is also applied to get a gate 453 by means of a lead 454 and to a gate 455 by means of a lead 456. Gate 451 is opened by a coarse pulse appearing on line 438 connected thereto. This coarse pulse is also utilized to close gate 455 by means of a lead 474. Gate 451 is a coincidence gate or the type of gate which remains open only while the coarse pulse is present on lead 438. The coarse pulse on lead 438 is of a sufficiently long duration to allow at least one full pulse from amplifier 450 to pass through gate 451. This pulse which passes through gate 451 is then applied to a delay circuit 457 by means of a lead 458. The delayed pulse delay circuit 457 is applied to open gate 453 by lead 459. The delay circuit 457 operates on the first pulse arriving from amplifier 450 to delay it a sufficient amount to open gate 453 after the same pulse appearing on lead 454 has disappeared. Thus, gate 453 is opened by the first pulse which is allowed to pass through gate 451, but gate 453 does not pass this pulse. Gate 453 is the type of gate that remains open, once opened, until a pulse appears on a lead 460 to shut the gate. Thus, after the pulse appearing on lead 549 opens gate 453 a continuous train of pulses from amplifier 450 travel along lead 452, lead 454, through gate 453, and along a lead 461 to a fine counter 462. The pulses from gate 453 are also applied, by means of a lead 463 to reset an automatic calibrator counter 464 and along a lead 465 to reset an interpolative counter 466.

The pulse that passes through gate 451 during the time when the coarse pulse is prevalent on lead 438 is applied to open a gate 470 by means of a lead 471 and to open a gate 472 by means of a lead 473. A continuous train of pulses from an oscillator 475 is applied to the gate 470 by means of a lead 476. Oscillator 475 may be any oscillator that produces an electrical signal which has a frequency that is high relative to the pulses produced in detectors 50, 55 and 60. Once gate 470 is opened by the pulse on lead 471 from gate 451 the continuous train of high frequency pulses from oscillator 475 travels through the gate and along a lead 477 to automatic calibrator counter 464. The pulses from the oscillator 475 are also applied to gate 472 on a lead 480. Since gate 472 is opened by the first pulse from gate 451 the oscillator pulses are passed through gate 472 and into interpolative counter 466 by means of a lead 481.

The pulses from a detector which may be any of the detectors 50, 55 or 60, except the one just discussed in conjunction with amplifier 450, are applied to an amplifier 482 by means of lead 440. Amplifier 482 is similar to amplifier 450 and produces a set of pulses which are applied to a gate 483 by means of a lead 484. The coarse pulses from the above mentioned detector appearing on lead 442 are applied to gate 483 to open the gate. Gate 483 is a coincidence gate similar to gate 451 and is open only while a coarse pulse is prevalent on lead 442. As long as a coarse pulse is applied to gate 483 the gate is open and a fine pulse from the amplifier 482 will pass through. The fine pulse passing through gate 483 appears on a lead 485 and may be utilized as a "timing pulse" to denote the precise instant at which the relative angle of rotation between the two members was measured. The fine pulse also appears on a lead 486 to close gate 472, on a lead 487 to open gate 455 and on lead 460 to close gate 453.

As soon as the pulse from gate 483 is applied to gate 453 and closes that gate, no more fine pulses from amplifier 450 are applied to fine counter 462 so that a final reading from that counter may be taken. Since no more fine pulses pass through gate 453, no more reset pulses are applied to counters 464 and 466. A pulse from amplifier 482 also closes gate 472 so that no more pulses from the oscillator 475 are applied to interpolative counter 466 and the final count in that counter may be read. In order to determine the proper time to read the final count on fine counter 462 and interpolative counter 466 a "read pulse" appears on a lead 488. The "read pulse" on lead 488 is a pulse from amplifier 450 which is allowed to pass through gate 455 once gate 455 is opened by a pulse from amplifier 482. The pulses from amplifier 450 continue to pass through gate 455 and on to lead 488 until a coarse pulse from the detector again appears on lead 438 to open gate 451 and close gate 455. The next pulse from amplifier 450 then resets the automatic calibrator counter 464 and interpolative counter 466 and the entire counting cycle begins again.

The relative rotation or the angle of rotation between the two members, which may for example be the rotatable member 35 and the base 10 (in which case the pulses appearing on leads 436 and 438 would originate in detector 50 and the pulses appearing on leads 440 and 442 would originate in detector 60), is determined in the following manner. The pulses in fine counter 462 are an indication of the angle to within one fine pulse and the ratio of the number of pulses in counter 466 to the number of pulses in counter 464 are an indication of the fraction of a fine pulse. Thus, the addition of the pulses in counter 462 and the portion of a pulse indicated by counters 464 and 466 provide an extremely accurate indication of the angle.

A complete counting cycle occurs each time the cooperative means 47' on a pair of adjacent surfaces rotate past each other. Since this generally occurs a large number of times per second the rate of change of the angles can be computed. In this embodiment a rate computer 490 is connected to the interpolative counter 466 by means of a lead 492, to the automatic calibrator counter 464 by means of a lead 493, to the fine counter 462 by means of a lead 491 and to the "read indicate" line 488 by means of a lead 494. The rate computer 490 contains a digital to analog circuit and an analog rate circuit. Thus, the digital output of the counters is converted to an analog signal and the rate circuit indicates the rate of change of the analog signal. This apparatus is simply one embodiment for providing an angular rate indication, and it should be understood that one skilled in the art could think of many modifications and other embodiments within the scope of this invention.

In FIGURE 3, the electronics 100 receive pulses from detector 50 and detector 60 which are indicative of the relative rotation between rotor 13 and frame 10, and rotor 13 and member 35. These pulses are operated on in the manner just described to provide a signal δ on a lead 120 which is an electrical signal indicative of the relative rotation between member 35 and frame 10. The electronics 100 also provide an electrical signal dδ on a lead 121 indicative of the rate of rotation between member 35 and frame 10. The electronics 102 receive pulses from detector 50 and detector 55 which are indicative of the relative rotation between rotor 13 and frame 10, and rotor 13 and member 25. These pulses are operated on in the manner previously described to provide a signal β on a lead 122 which is an electrical signal indicative of the relative rotation between member 25 and frame 10. The electronics 102 also provide an electrical signal dβ on a lead 123 indicative of the rate of rotation between member 25 and frame 10. The electronics 104 receive pulses from detector 55 and detector 60 which are indicative of the relative rotation between rotor 13 and member 25, and rotor 13 and member 35. These pulses are operated on in the manner previously described to provide a signal α on a lead 124 which is an electrical signal indicative of the relative rotation between member 25 and member 35. The electronics 104 also provide an electrical signal $d\alpha$ on a lead 125 indicative of the rate of rotation between member 25 and member 35.

Thus, the present invention is capable of measuring the angle of rotation of each of a plurality of inputs relative to each other and to the frame, and the rate of change or the rate of rotation of all of these inputs. This invention has the additional advantage that it can provide indications of these measurements with an extreme degree of accuracy and, also, a large number of times per second.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit or scope of this invention.

I claim:

1. An angle pickoff of the class described comprising:
   (a) base means having a first surface;
   (b) a plurality of second surfaces;
   (c) cooperative means situated on all of said surfaces;
   (d) energizing means connected to said cooperative means;
   (e) means mounting said plurality of second surfaces for rotation in juxtaposition with respect to said first surface and with respect to each other to form a plurality of pairs of surfaces, said cooperative means on one surface of each of said pairs coacting with said cooperative means on the other surface of each of said pairs upon relative rotation therebetween to provide output pulses;
   (f) a plurality of mechanical inputs driving said plurality of second surfaces; and
   (g) means connected to receive said output pulses having electrical outputs indicative of the rotation and the rate of rotation of said plurality of second surfaces with respect to each other and with respect to said base means.

2. An angle pickoff of the class described comprising:
   (a) base means having a first surface;
   (b) a plurality of second surfaces;
   (c) cooperative means situated on all of said surfaces;
   (d) energizing means connected to said cooperative means;
   (e) means mounting said plurality of surfaces for rotation in juxtaposition with respect to said first surface and with respect to each other to form a plurality of pairs of surfaces, said cooperative means on one surface of each of said pairs coacting with said cooperative means on the other surface of each of said pairs upon relative rotation therebetween to provide output pulses;
   (f) means for continuously rotating one surface of each of said pairs of surfaces;
   (g) a plurality of mechanical inputs driving the remainder of said plurality of second surfaces; and
   (h) means connected to receive said output pulses having electrical outputs indicative of the rotation and the rate of rotation of said plurality of second surfaces with respect to each other and with respect to said base means.

3. An angle pickoff of the class described comprising:
   (a) base means having a first surface;
   (b) a plurality of second surfaces;
   (c) cooperative means situated on all of said surfaces;
   (d) energizing means connected to said cooperative means;
   (e) means mounting said plurality of surfaces for rotation in juxtaposition with respect to said first surface and with respect to each other to form a plurality of pairs of surfaces, said cooperative means on one surface of each of said pairs coacting with said cooperative means on the other surface of each of said pairs upon relative rotation therebetween to provide output pulses;
   (f) means for continuously rotating one surface of each of said pairs of surfaces; and
   (g) a plurality of mechanical inputs driving the remainder of said plurality of second surfaces.

4. An angle pickoff of the class described comprising:
   (a) base means having a first surface;
   (b) a plurality of second surfaces;
   (c) cooperative means situated on all of said surfaces;
   (d) energizing means connected to said cooperative means;
   (e) means mounting said plurality of second surfaces for rotation in juxtaposition with respect to said first surface and with respect to each other to form a plurality of pairs of surfaces, said cooperative means on one surface of each of said pairs coacting with said cooperative means on the other surface of each of said pairs upon relative rotation therebetween to provide output pulses;
   (f) a plurality of mechanical inputs driving said plurality of second surfaces;
   (g) a high frequency oscillator; and
   (h) means connected to receive said output pulses and said high frequency oscillator pulses, said means utilizing said oscillator pulses for an indication of a portion of an output pulse and said means having electrical outputs indicative of the rotation and the rate of rotation of said plurality of second surfaces with respect to each other and with respect to said base means.

5. An angle pickoff of the class described comprising:
   (a) base means having a first surface;
   (b) a plurality of second surfaces;
   (c) cooperative means situated on all of said surfaces;
   (d) energizing means connected to said cooperative means;
   (e) means mounting said plurality of surfaces for rotation in juxtaposition with respect to said first surface and with respect to each other to form a plurality of pairs of surfaces, said cooperative means on one surface of each of said pairs coacting with said cooperative means on the other surface of each of said pairs upon relative rotation therebetween to provide output pulses;
   (f) means for continuously rotating one surface of each of said pairs of surfaces; and
   (g) means for applying a plurality of mechanical inputs to drive the remainder of said plurality of second surfaces.

References Cited by the Examiner

UNITED STATES PATENTS 3,096,444  7/1963  Seward _____ 340—347

DARYL W. COOK, *Acting Primary Examiner.*

MALCOLM MORRISON, K. R. STEVENS,
*Assistant Examiners.*